(12) United States Patent
Buckingham et al.

(10) Patent No.: US 6,657,970 B1
(45) Date of Patent: *Dec. 2, 2003

(54) METHOD AND APPARATUS FOR LINK STATE DETERMINATION IN VOICE OVER FRAME-RELAY NETWORKS

(75) Inventors: Patrik Buckingham, San Jose, CA (US); Michael Tasker, Pleasanton, CA (US); Christine Yu, Sunnyvale, CA (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 49 days.

(21) Appl. No.: 09/259,672

(22) Filed: Feb. 26, 1999

(51) Int. Cl.[7] ............................................. H04L 12/64
(52) U.S. Cl. ........................ 370/249; 370/252; 370/356
(58) Field of Search ................................. 370/248, 249, 370/252, 352–356

(56) References Cited

U.S. PATENT DOCUMENTS

| | | |
|---|---|---|
| 4,747,130 A | 5/1988 | Ho |
| 4,862,452 A | 8/1989 | Milton et al. |
| 4,955,054 A | 9/1990 | Boyd, Jr. et al. |
| 4,991,169 A | 2/1991 | Davis et al. |
| 5,150,357 A | 9/1992 | Hopner et al. |
| 5,224,099 A | 6/1993 | Corbalis et al. |
| 5,313,454 A | 5/1994 | Bustini et al. |
| 5,359,592 A | 10/1994 | Corbalis et al. |
| 5,410,599 A | 4/1995 | Crowley et al. |
| 5,434,981 A | 7/1995 | Lenihan et al. |
| 5,442,789 A | 8/1995 | Baker et al. |
| 5,497,373 A | 3/1996 | Hulen et al. |
| 5,515,363 A | 5/1996 | Ben-Nun et al. |
| 5,526,344 A | 6/1996 | Diaz et al. |

(List continued on next page.)

OTHER PUBLICATIONS

Doug O'Leary, "Frame Relay/ATM PVC Service Interworking Implementation Agreement," Frame Relay Forum, pp. 1–24, Apr. 14, 1995.

(List continued on next page.)

*Primary Examiner*—Melvin Marcelo
(74) *Attorney, Agent, or Firm*—Blakely, Sokoloff, Taylor & Zafman LLP

(57) ABSTRACT

A method and apparatus for link state determination in voice over frame-relay networks. In one embodiment, the present invention includes a method for determining link state for permanent calls in an FRF.11 voice over data network at the virtual voice channel level. This is a capability not present in FRF.11, which includes a management mechanism for determining link state of virtual circuits, but no mechanism for determining link state of virtual channels. One embodiment uses a standard FRF.11 signaling frame with a status indicator bit to signal that a channel is a primary operative channel or an alternate operative channel. The signaling frames are sent end to end through the network by an initiator device along a primary data path and all alternate data paths. If a primary or alternate path is operative, a reciprocator device returns the signaling frame along the operative path. The initiator determines by receipt or non-receipt of the signaling frames which paths are operative at any time. This allows the initiator to quickly detect primary path failure and switch to an operative alternate path.

25 Claims, 14 Drawing Sheets

U.S. PATENT DOCUMENTS

| | | | |
|---|---|---|---|
| 5,528,595 | A | 6/1996 | Walsh et al. |
| 5,561,663 | A | 10/1996 | Klausmeier |
| 5,594,727 | A | 1/1997 | Kolbenson et al. |
| 5,602,848 | A | 2/1997 | Andrews et al. |
| 5,615,211 | A | 3/1997 | Santore et al. |
| 5,623,491 | A | 4/1997 | Skoog |
| 5,719,865 | A | 2/1998 | Sato |
| 5,724,513 | A | 3/1998 | Ben-Nun et al. |
| 5,734,656 | A | 3/1998 | Prince et al. |
| 5,742,596 | A | 4/1998 | Baratz et al. |
| 5,745,490 | A | 4/1998 | Ghufran et al. |
| 5,765,032 | A | 6/1998 | Valizadeh |
| 5,771,232 | A | 6/1998 | Sinibaldi et al. |
| 5,793,747 | A | 8/1998 | Kline |
| 5,835,494 | A | 11/1998 | Hughes et al. |
| 5,838,994 | A | 11/1998 | Valizadeh |
| 5,862,211 | A | 1/1999 | Roush |
| 5,883,804 | A | 3/1999 | Christensen |
| 5,894,477 | A | 4/1999 | Brueckheimer et al. |
| 5,974,033 | A | 10/1999 | Kamiya et al. |
| 6,002,666 | A | 12/1999 | Fukano |
| 6,005,868 | A | 12/1999 | Ito |
| 6,009,507 | A | 12/1999 | Brooks et al. |
| 6,011,780 | A * | 1/2000 | Vaman et al. ............... 370/237 |
| 6,028,858 | A | 2/2000 | Rivers et al. |
| 6,052,375 | A | 4/2000 | Bass et al. |
| 6,058,117 | A | 5/2000 | Ennamorato et al. |
| 6,104,721 | A | 8/2000 | Hsu |
| 6,118,864 | A | 9/2000 | Chang et al. |
| 6,144,637 | A | 11/2000 | Calvignac et al. |
| 6,181,694 | B1 | 1/2001 | Pickett |
| 6,266,342 | B1 | 7/2001 | Stacey et al. |
| 6,272,109 | B1 | 8/2001 | Pei et al. |
| 6,311,288 | B1 * | 10/2001 | Heeren et al. ............... 370/217 |

OTHER PUBLICATIONS

Gary Lee, et al., "A Mangement Briefing on Frames to Cells , Frame Relay and Frame UNI in ATM Networks," General DataComm, pp. 1–12 (1997).

Addison Ching, "CEDPA Launches Discussion Lists", Oct.–Nov. 1997, The DataBus, vol. 37, No. 6, pp. 1–10 (Huntington Beach, CA, Oct.–Nov. 1997).

B. Thompson, et al., "DSP Resource Manager Interface and its Role in DSP Multimedia," IEEE, pp. 291–298, 1994.

Edward B. Morgan, "Voice Over Packet, White Paper," Telogy Networks, pp. 1–13, 1997.

S. Mangiapane, "Cisco Announces MC3810 Multiservice Access Concentrator," The Databus, vol. 37, No. 6, pp. 1–3, Oct.–Nov. 1997.

"Voice Over Frame Relay Implementation Agreement, FRF 11.1," Frame Relay Forum Technical Committee, pp. I–vi and 1–46 (Revision History: FRF.11 May 1997; FRF.11.1 Annex J Added Dec. 1998.

"Annex B to Voice Over Frame Relay Implementation Agreement, FRF .11," Frame Relay Forum Technical Committee, pp. B–1 & B–2 (May 1997).

R. Iyer & Cisco Systems, "*A TDM Interface for the TMS320C54X DSP, Application Report: SPRA453*," Digital Signal Processing Solutions (Texas Instruments Jun. 1998).

* cited by examiner

US 6,657,970 B1

METHOD AND APPARATUS FOR LINK STATE DETERMINATION IN VOICE OVER FRAME-RELAY NETWORKS

FIELD OF THE INVENTION

The present invention relates generally to the routing of information cross networks and, more particularly, to the determination of link state status in the routing of voice over frame-relay information across multiservice networks.

BACKGROUND OF THE INVENTION

Until recently there has persisted a fundamental dichotomy between two main types of telecommunication networks. The first type of telecommunication network, the telephone network, switches and transports predominantly voice, facsimile, and modulation-demodulation system (modem) traffic. The public switched telephone network (PSTN) is an example of this type of network. Telephone networks are also deployed privately within organizations such as corporations, banks, campuses, and government offices. The second type of telecommunication network, the data network, switches or routes and transports data and video between computers. The Internet is an example of a public data network; data networks may be privately deployed.

Telephone networks were developed and deployed earlier, followed by data networks. Telephone network infrastructures are ubiquitous, however, and as a result data networks typically are built, to a limited extent, using some components of telephone networks. For example, the end user access link to a data network in some cases is implemented with a dial-up telephone line. The dial-up telephone line thus connects the end user computer equipment to the data network access gateway. Also, high speed digital trunks interconnecting remote switches and routers of a data network are often leased from telephone long-haul carriers.

Nonetheless, telephone and data network infrastructures are usually deployed together with limited sharing of resources, especially with regards to the core components of the networks—the switches and routers that steer the payloads throughout the networks. Furthermore, multiservice network switches are used to provide a data path, or interface, between multiple networks, each of which may operate using a different type of data or according to a different networking standard protocol. Examples of the networking protocols supported by these multiservice switches include, but are not limited to, frame relay, voice, circuit emulation, T1 channelized, E1 channelized, and Asynchronous Transfer Mode (ATM). The cost of this redundancy coupled with advances in data network technology has led, where possible, to integrated network traffic comprising voice, data, facsimile, and modem information over a unified data network. As such, a data network should now be able to accept, service, and deliver any type of data over its access links on a random, dynamic basis using a minimum set of hardware on a single platform. The problem remains, however, that a typical router or concentrator routes data through packet switch networks while voice and video traffic are routed through circuit switch networks, each of which uses different physical switch equipment.

The aforementioned desire to integrate network traffic and transport the traffic over a unified data network has heretofore resulted in a limited sharing of network resources, especially with regards to the core network switches and routers that steer the payloads throughout the networks. As such, a data network should now be able to accept, service, and deliver any type of data over its access links on a random, dynamic basis using a minimum set of hardware on a single platform. Typical routers include a group of the same dedicated hardware and software resources for each channel of information processed through the router. This scheme, however, limits the number of information channels that can be processed by a router. Furthermore, this scheme wastes router resources because, as the router accommodates many different types of data, and all of the different types of data do not require the same resources for processing, many allocated resources stand idle on the typical router.

Consequently, a router is desired that provides for dynamic allocation of router resources among the received channels of information on an as-needed basis, wherein the cost, size, and complexity of the router is reduced by minimizing the duplication of resources among router channels.

Conventional routers attempt to maximize the use of resources using the concept of virtual circuits. A virtual circuit includes hardware and software on the router that performs router functions for a particular incoming or outgoing call. Many virtual circuits may be multiplexed onto a single physical interface. This is a well-known Frame Relay concept as defined in Frame Relay Forum implementation agreement (FRF).1 and International Telecommunications Union (ITU) Q.922. Because voice data may be routed through many virtual circuits, it is important to have knowledge of link state information for each of the virtual circuits multiplexed onto a physical carrier. FRF.1 addresses this problem at the virtual circuit level by defining a Local Management Interface (LMI), which provides link state information for each of the virtual circuits multiplexed onto the physical interface carrier.

FRF.11 defines a mechanism for multiplexing up to 255 voice subchannels, or FRF.11 virtual channels, onto a single Frame Relay virtual circuit. The FRF.11 definition is similar in concept to the multiplexing of several FRF.1 virtual circuits onto a single physical interface that occurs in the FRF.1 definition. Just as FRF.1 virtual channels can be switched between physical interfaces, voice virtual channels may be switched between Frame Relay virtual circuits. In conventional networks, however, the link state of the carrier is not reflective of the link state of the channel connections. FRF.11 does not define a mechanism similar to LMI for determining the link state of voice channels. Accurate and dynamic link state knowledge of voice channels is critical to the successful routing of voice streams through an FRF.11 network, however, because routing decisions must be made at every switch point.

Channel link state cannot be determined solely on the basis of receipt of voice data or failure to receive voice data. Failure to receive voice data may simply be an indication that there was no voice data to send, rather than an indication of path failure. It is therefore desirable to determine a link state of backup or standby routes at the channel level. It is also desirable to determine a link state of these routes before voice information is sent over the routes and before failure occurs on primary routes.

SUMMARY AND OBJECTS OF THE INVENTION

It is therefore an object of the invention to integrate data, voice, and video onto public and private packet-based or cell-based multiservice data networks comprising Frame Relay, Asynchronous Transfer Mode (ATM), High-level Data Link Control (HDLC), Internet Protocol (IP), and Time Division Multiplexed (TDM) networks, and leased line carrier services.

It is a further object of the invention to provide a trunk that is software configurable at the physical and protocol levels to support T1/E1, Frame Relay, ATM, HDLC, IP, and TDM services.

It is a further object of the invention to provide a method and apparatus for dynamically determining multi-level link state for Frame Relay networks.

These and other objects of the invention are provided by a Multiservice Access Concentrator (MAC).

Other objects, features, and advantages of the present invention will be apparent from the accompanying drawings and from the detailed description which follows below.

In one embodiment, the present invention includes a method for determining link state for permanent calls in an FRF.11 voice over data network at the virtual voice channel level. This is a capability not present in FRF.11, which includes a management mechanism for determining link state of virtual circuits, but does not include a mechanism for determining link state of virtual channels. One embodiment uses a standard FRF.11 signaling frame with a status indicator bit to signal that a channel is a primary operative channel or an alternate operative channel. The signaling frames are sent end to end through the network by an initiator device along a primary data path and all alternate data paths. If a primary or alternate path is operative, a reciprocator device returns the signaling frame along the operative path. The initiator determines by receipt or non-receipt of the signaling frames which paths are operative at any time. This allows the initiator to quickly detect primary path failure and switch to an operative alternate path.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Figure 1:
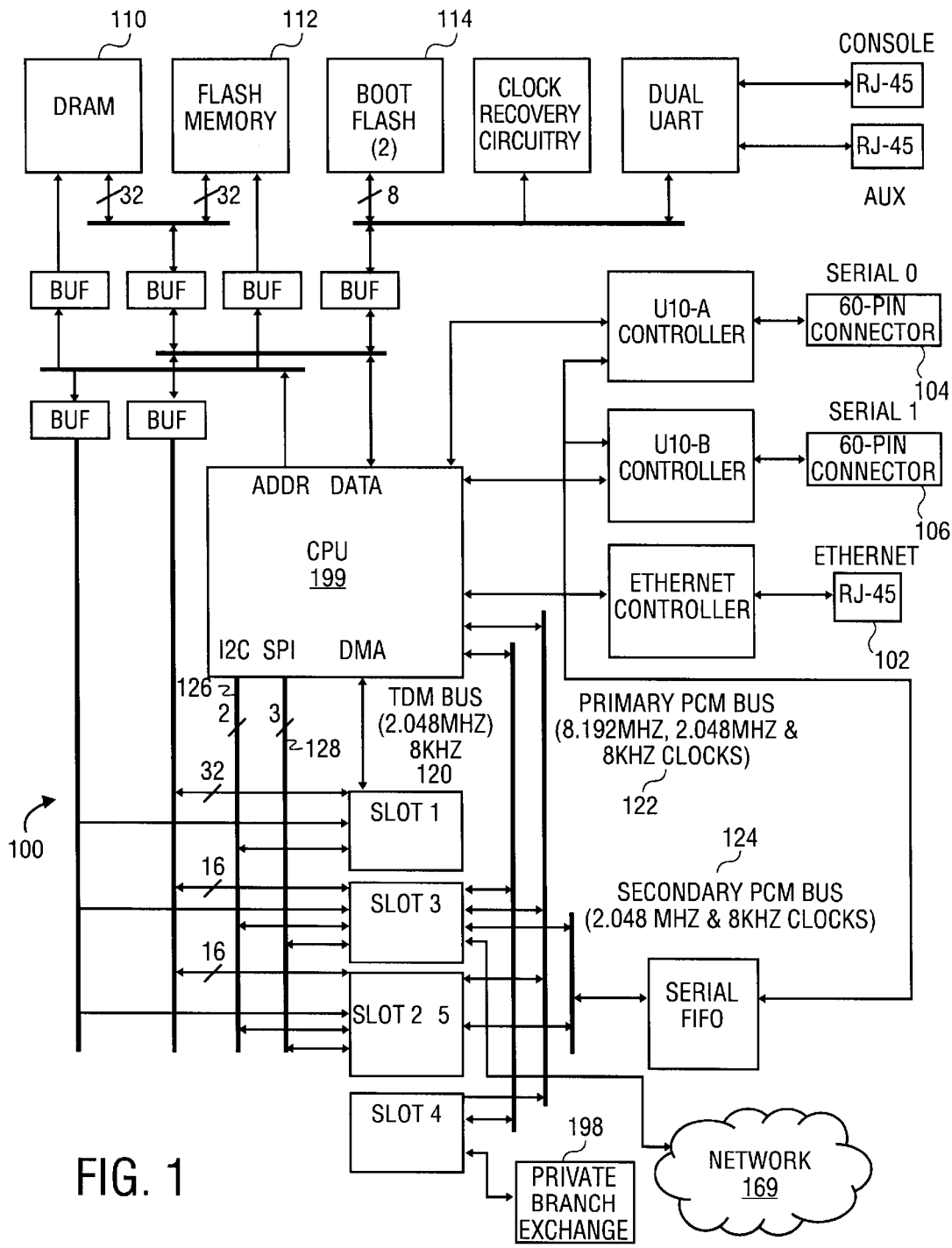
FIG. 1 is a system block diagram of a Multiservice Access Concentrator (MAC) of an embodiment of the present invention for routing integrated data, voice, and video traffic.

FIG. 1 is a system block diagram of a Multiservice Access Concentrator (MAC) 100 of an embodiment of the present invention for routing integrated data, voice, and video traffic. The MAC 100 of an embodiment is a compact, low-cost multi-service access device that integrates local area network (LAN), synchronous data, voice, video and facsimile traffic for transport over a network system 169 comprising public and private Frame Relay, asynchronous transfer mode (ATM), synchronous transfer mode, bisynchronous transfer mode, and time division multiplexed (TDM) networks. Multi-protocol routing is combined with voice, but the embodiment is not so limited. The video support of the MAC of an embodiment comprises transport over ATM, Frame Relay, and TDM circuits. The MAC uses a software-configurable wide area network (WAN) trunk to seamlessly integrate data, voice, and video into existing networks using common switch and network hardware, and without reconfiguring the network switch hardware, but the embodiment is not so limited.

The MAC of an embodiment provides voice over packet-data-network capabilities comprising, but not limited to ATM or Frame Relay technology over T1/E1, Circuit Emulation Service (CES) for video, packetized voice over ATM, Frame Relay, and Internet Protocol (IP), voice compression, and telephony capabilities. The MAC of an embodiment has the processing power to meet the demands of an ATM access device, and can multiplex voice, video, and data applications onto trunks running at speeds from 56/64 kbps to E1, but the embodiment is not so limited.

The software architecture of the MAC of an embodiment is a modular design which may be used in a distributed environment, but the embodiment is not so limited. The MAC uses an internetwork software operating system that provides kernel services, network services and routing capability, but the embodiment is not so limited. The interface ports of the MAC of an embodiment comprise a single Ethernet port 102, two serial ports 104–106 that support speeds up to 2 Mbps, and either six analog voice ports or a single digital voice access port (T1/E1), but the embodiment is not so limited. The analog voice port configuration provides up to six uncompressed or compressed voice channels, while the digital voice port configuration provides up to 24 compressed voice channels, but the embodiment is not so limited. As many as 30 channels are available for passing voice channels via TDM channels, but the embodiment is not so limited. Furthermore, combinations of compressed and PCM voice are available.

The MAC of an embodiment provides a 10BaseT Ethernet port or two universal input/output (UIO) serial ports to provide data and video, and route it to the proper destination using a wide area network (WAN) trunk, but the embodiment is not so limited. The UIO supports connectivity to a digital carrier service at a number of clock rates. There are two UIO serial ports, serial 0 and serial 1. Serial 0 receives timing data, or clock data, and distributes it to serial 1.

Consequently, serial 0 should be used as a network trunk port, but the embodiment is not so limited. Furthermore, the UIO port receives video traffic. Following circuit emulation, the video traffic is transported using the WAN. trunk. The MAC supports analog voice streams using Ear and Mouth (E&M) (2 wire and 4 wire with immediate dial, delay dial and wink start), Foreign Exchange Station (FXS) (ground start and loop start), and Foreign Exchange Office (FXO) (ground start and loop start) voice signal standards. Furthermore, the MAC supports digital voice streams using T1/E1/UIO interfaces. The MAC receives the voice traffic from these ports and implements a voice compression algorithm, but the embodiment is not so limited. Moreover, echo cancellation is also implemented to improve the quality, wherein 8 to 32 millisecond echo tails are accommodated, but the embodiment is not so limited. The compressed voice is packetized and transported over the WAN trunk. The WAN trunk access of an embodiment is through either a T1/E1 access card or a UIO port that supports ATM (T1/E1 trunk), Frame Relay, and HDLC networks.

Figure 2:
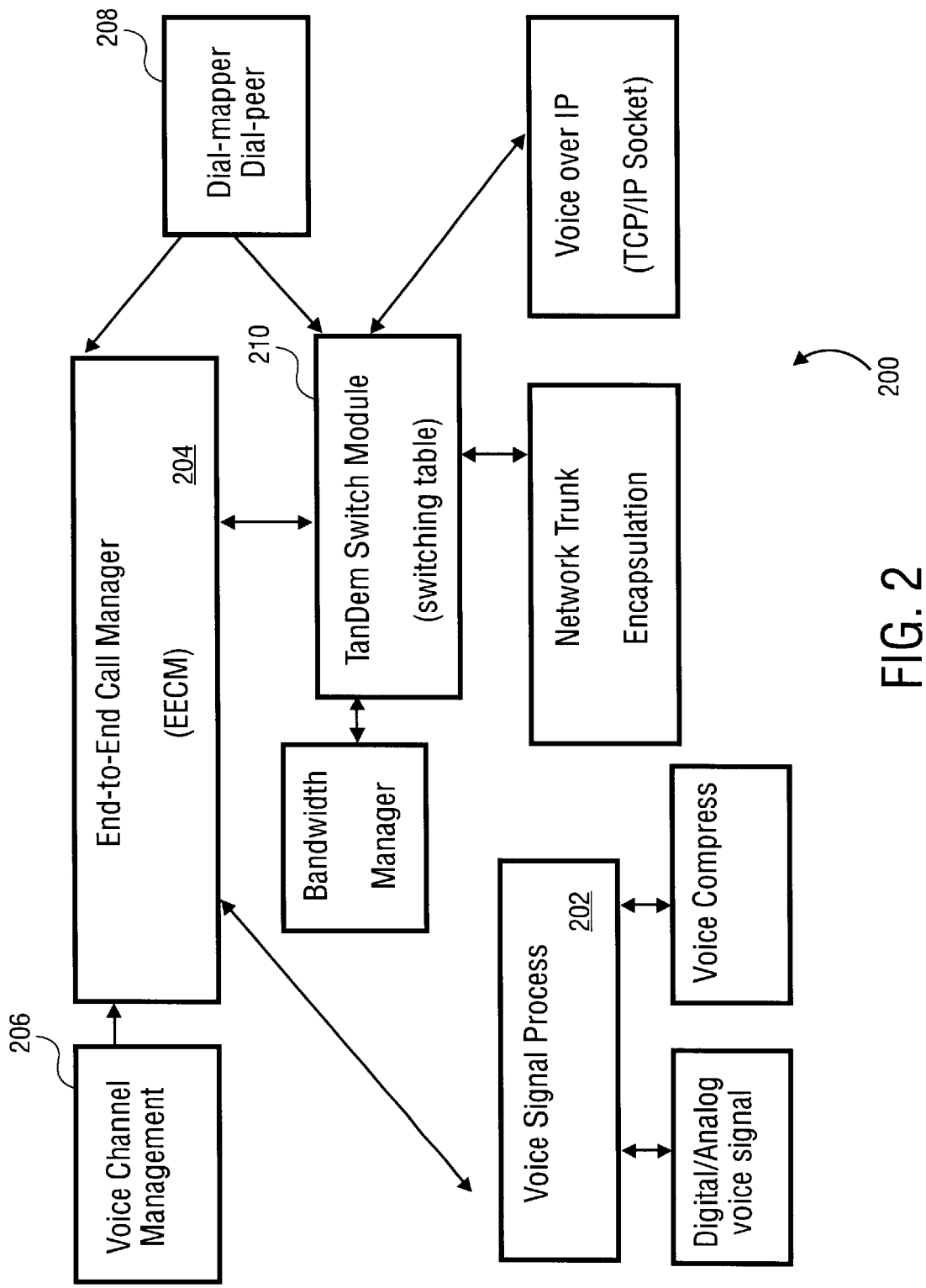
FIG. 2 is a voice processing subsystem of a MAC of an embodiment of the present invention.

FIG. 2 is a voice processing subsystem 200 of a MAC of an embodiment of the present invention. The internetwork software operating system that provides kernel services, network services and routing capability comprises the voice processing subsystem 200, but the embodiment is not so limited. In operation, an analog voice port or digital voice port provides a voice signal to the Voice Signal Process module 202. The Voice Signal Process module 202 translates the voice signal to a call setup message. The call setup message is sent to the End-to-End Call Manager (EECM) 204, wherein a call setup procedure is initiated. The call setup procedure comprises calling the Voice Channel Manager 206 to allocate a DSP for connection to the receiving voice port via the PCM bus. Furthermore, the call setup procedure signals the Voice Signal Process module 202 to enable the allocated DSP to start the DTMF sampling for the dialing digits. Upon collection of enough digits by consulting the dial-mapper 208, a setup message is provided to the .Tandem Switch Module 210. The Tandem Switch Module 210, using the Dial-peer and Dial-mapper 208, locates the permanent virtual connection (PVC) number of the remote extension in order to provide a setup message.

With reference to FIG. 1, the interface ports of the MAC 100 are coupled to a central processing unit (CPU) 199, but the embodiment is not so limited. Multiple memory devices 110–114 are coupled to the CPU 199 of one embodiment, wherein dynamic random access memory (DRAM) 110 is supported in 4, 8, 16, and 32 Mb single inline memory modules (SIMMs) and flash memory 112–114, or nonvolatile memory, is supported in 4, 8, and 16 Mb memory devices, but the embodiment is not so limited. A 32-bit SIMM socket supports up to 64-Mbyte of program memory and data storage memory 110. A 32-bit SIMM socket supports up to 32-Mbyte of flash memory 112. Furthermore, a 512-Kbyte boot flash 114 is provided, but the embodiment is not so limited.

Moreover, a 2-Mbyte on-board flash memory 112 supports system con figuration.

The MAC of an embodiment comprises five option slots coupled to the CPU 199, but the embodiment is not so limited. The option slots provide expanded services for voice and data using plug-in modules (PIMs), but are not so limited. The plug-in modules supported in an embodiment comprise a multi-flex trunk module (MTM), a voice compression module (VCM), an analog voice module (AVM), a digital voice module (DVM), and a data compression/encryption module (DCM), but the embodiment is not so limited.

The MAC of an embodiment comprises a bus system that couples the resources of the MAC. The bus system comprises a host bus, a system memory bus, an extended auxiliary bus, a plug-in module slot bus, a PCM bus, an I-square bus, and an SPI bus, but the embodiment is not so limited. The buses of an embodiment are coupled to the CPU directly or to the host bus using buffers. A bus controller maintains control of the buffers for each bus transaction. The bus controller of one embodiment is implemented using field programmable gate arrays (FPGAs), but the embodiment is not so limited.

The host bus of an embodiment is an extension of the, CPU external interface signals which include 32-bit data bus signals, 32-bit address bus signals, and bus transaction control signals, but the embodiment is not so limited. As the MAC of an embodiment has one CPU, or master, there is no external bus arbitration logic to support multiple masters, but the embodiment is not so limited.

The system memory bus of the MAC of an embodiment is a 32-bit bus coupled to the host bus using at least one buffer, but the embodiment is not so limited. The CPU and DMA can access system main memory, a dynamic random access memory (DRAM), but the embodiment is not so limited. Furthermore, the 32-bit flash memory for internetwork operating system code storage resides on the system memory bus.

The extended auxiliary bus of the MAC of an embodiment comprises an 8-bit bus which is connected to the host bus through a buffer, but, the embodiment is not so limited. The 512-Kbyte boot-flash memory, 2-Mbyte on-board flash memory, and a dual UART device reside on the extended auxiliary bus.

As discussed herein, and with reference to FIG. 1, the MAC of an embodiment comprises five plug-in module (PIM) slots. The PIM slot bus provides the signals among the CPU 199 and each of these slots. Each of the slots share common signals including bus transaction control, data and address, and voltage and return ground signals.

The MAC 100 of an embodiment comprises three PCM buses 120–124, but the embodiment is not so limited. The PCM bus signals comprise an 8K frame sync pulse mark, 2.048 MHz clock, 8 MHz clock, transmit data, and receive data, but the embodiment is not so limited.

The first PCM bus is a TDM bus 120 between the CPU 199 and PIM slots 3 and 4 that provides a dedicated serial connection between the CPU 199 and the MTM. The second PCM bus is the primary PCM bus 122 that couples the CPU 199 among PIM slots 2, 3, 4, and 5. The primary PCM bus 122 is used among the AVM, VCM, DVM, DCM, and CPU for voice applications. For example, after the analog voice signal is converted into 8-bit PCM data by a coder/decoder (codec) on the AVM, it can be mapped into one of 32 time slots of this PCM bus, but the embodiment is not so limited. Then the VCM can be programmed to pick up the PCM data from this time slot and compress it to 8 Kbps data.

The primary PCM bus 122 of an embodiment comprises a 32-time-slot PCM bus, but the embodiment is not so limited. The primary PCM bus 122 provides the voice data from the Digital Voice Module or the Analog Voice Module. The primary PCM bus 122 of an embodiment runs at an approximate clock speed of 2.048 MHz, wherein the clock is derived from the network, but the embodiment is not so limited. One end of the primary PCM bus 122 receives voice in a PCM format from a voice I/O device; the other end of the primary PCM bus 122 can be coupled to devices comprising a digital signal processor, a CPU, and a T1/E1 network trunk, but the embodiment is not so limited. Each voice port is dynamically coupled to one of the PCM bus time slots by programming the cross-connect device when it detects the off-hook signal from a voice port. Upon completion of a voice call, the PCM time-slot is freed for the next call, wherein the next call may come from a different voice port.

The third PCM bus is the secondary PCM bus 124 that couples PIM slots 2, 3, and 5 to a UIO port 104. The secondary PCM bus 124 is used for mapping N×64 Kbps data from UIO ports to any time slot on the trunk line in the MTM on PIM slot, but the embodiment is not so limited.

The I-square bus 126 of the MAC 100 of an embodiment is a two-wire interface that provides serial data and a clock signal of approximately 189 KHz from the CPU 199 to PIM slots 1, 2, 3, and 5. The CPU 199 uses the synchronous I-square bus 126 to exchange data with the EEPROM;of the corresponding PIM slots.

The Serial Peripheral Interface (SPI) bus 128 of the MAC 100 of an embodiment is routed among the CPU 199 and PIM slots 2, 3, and 5. The SPI bus 128 is a serial peripheral interface comprising four wires: clock, transmit data, receive data and slave device select. The SPI bus 128 of an embodiment is running at 700 KHz, but the embodiment is not so limited. When the slave device is selected, the master (CPU) uses the clock to shift out the transmitted data and shift in the received data. The SPI bus 128 provides another serial communication channel between the CPU 199 and the modules of the PIM slots.

The MAC of an embodiment supports an MTM PIM. The MTM is the option module which provides users with a software-configurable T1/E1 trunk capability having built-in, long-haul Channel Service Unit (CSU)/short-haul Data Service Unit (DSU), wherein .common hardware supports the software-configurable trunk. The MTM may be coupled to Frame Relay, ATM, or leased-line carrier services. When the MTM is present in the MAC, the MAC supports either packet or circuit switch applications. As such, the MTM, supports ATM, Frame Relay, and serial link protocols as the network encapsulation. The line coded T1/E1 data is converted to 2.048 Mbps PCM data by an on-board framer; this framer extracts the clock from the received data, and the timing information is distributed to the UIOs and DVM. An Integrated Services Digital Network (ISDN) port provides a network back-up connection when the T1/E1 trunk is down, but the embodiment is not so limited. When the MTM is not present in the MAC, the MAC uses a UIO as the network trunk, wherein the MAC supports HDLC for Frame Relay protocol or serial link protocol.

The MAC of an embodiment comprises two PIMs that are used for network access, the DVM and AVM. The DVM, functionally equivalent to the MTM, provides connectivity to a digital private branch exchange 198 or channel bank. The voice channels can be either mapped to time slots on the primary PCM bus for voice compression or mapped to time slots on another PCM bus through a cross-connect switch.

The AVM of an embodiment supports telephone signaling interfaces comprising FXS, FXO and E&M, but the embodiment is not so limited. The AVM provides up to six analog voice ports in any combination of these interfaces, wherein the analog voice ports provide coupling between the MAC and a Key Telephone System (KTS) or even directly to a phone set. There is one sub-module for each interface that resides on the AVM. Furthermore, the AVM provides the standard telecommunication interface voltages. The on-board codecs are used to provide the analog-to-digital and digital-to-analog functions to interface the analog voice system to the PCM sub-system.

The MAC of an embodiment supports streaming video in a variety of ways. First, video traffic received from a video codec connected to a UIO port is transported on a dedicated time slot between systems using the TDM functionality of a T1/E1 trunk. Alternatively, a serial stream from a video codec is converted to ATM and transported across an ATM network. Finally, LAN-based video from IP networks can be routed through a MAC and transported via networks comprising ATM, Frame Relay, and HDLC networks.

The MAC of an embodiment supports ATM, Frame Relay, HDLC, and TDM trunk services. As such, the T1/E1 network trunk port hardware of the MAC of an embodiment can be configured using software to support three modes, but the embodiment is not so limited. The supported modes comprise: whole T1/E1 pipe running either ATM or HDLC (Frame Relay) data format; fractional T1/E1 running HDLC for Frame Relay only; and, fractional T1/E1 running HDLC for Frame Relay and some channels running TDM traffic. A TDM channel may be configured for use in video and voice applications. The video traffic is received from one of the UIO ports while the voice traffic is received from the UIO/Fractional T1/E1 Access port or from the Analog Voice Module, but the embodiment is not so limited. The TDM trunk provides channel-bank functionality not found in typical data access devices. The TDM capability provides greater flexibility in application support and reduces access charges by allowing multiple applications to use the same access trunk. For example, a group of time slots on the trunk may be allocated to Frame Relay, while others may be used for private branch exchange trunks, and still others may be allocated for video conferencing.

Furthermore, the MAC of an embodiment is software configurable for Frame Relay and ATM access. Voice, facsimile, and data are transported over,. ATM using a variable bit rate or a constant bit rate, but the embodiment is not so limited. Both structured and unstructured constant bit rate support is provided for video traffic.

Figure 3:
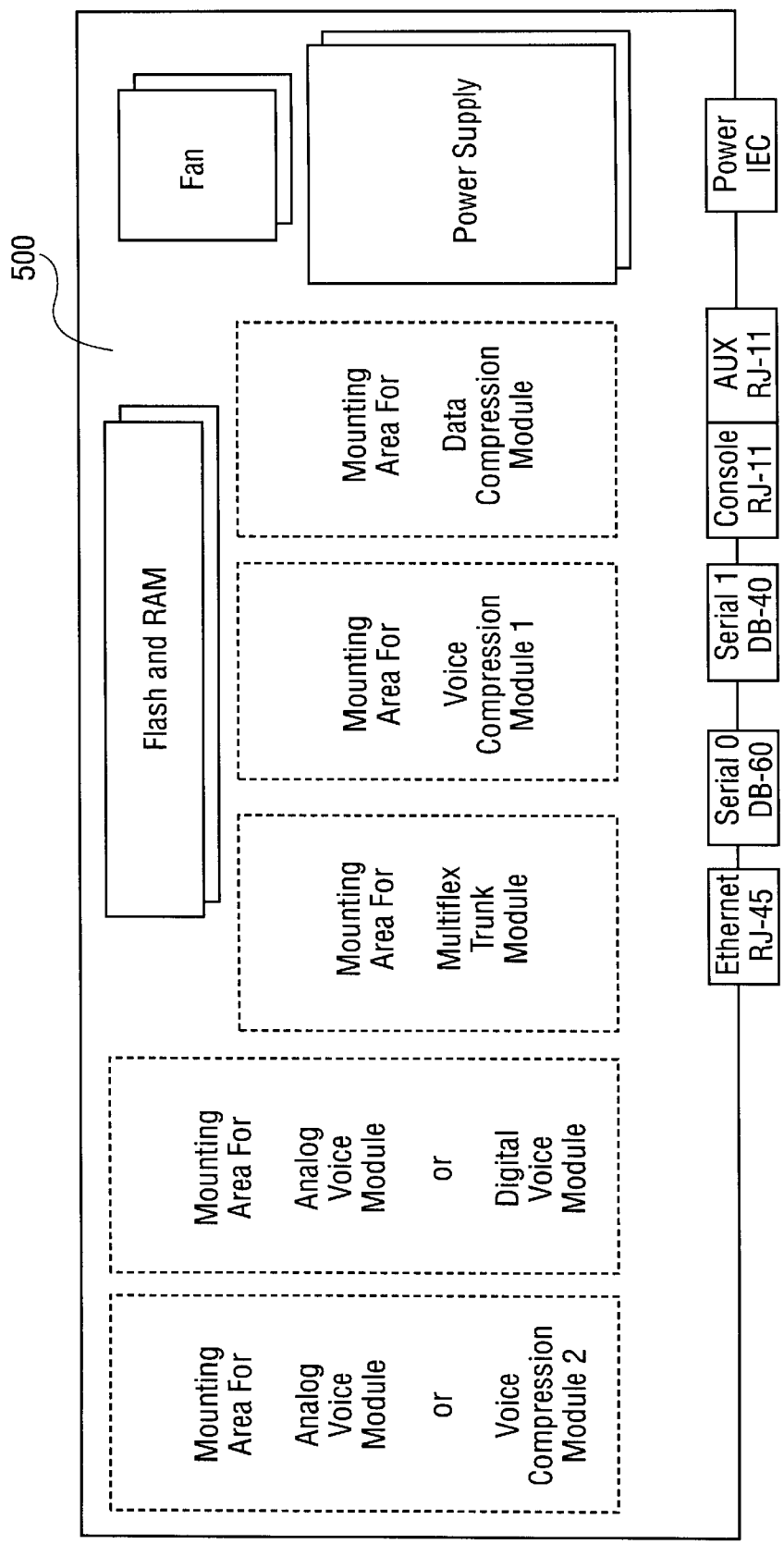
FIG. 3 is a block diagram of a basic configuration of a MAC of an embodiment of the present invention.

FIG. 3 is a block diagram of a basic configuration of a MAC 500 of an embodiment of the present invention. As previously discussed, a number of plug-in modules (PIMs) are supported by the MAC. The PIMs comprise a multiflex trunk module, a digital voice module, an analog voice module, three analog personality modules, a data compression module, and a voice compression module, but the embodiment is not so limited.

The Multiflex Trunk Module (MTM) of an embodiment provides the user with a multiservice T1/E1 trunk with built-in, long-haul CSU/short-haul DSU. The MTM is software configurable to support ANSI T1.403 (T1) or ITU G.703 (E1), but the embodiment is not so limited. Furthermore, the MTM supports connectivity to Frame Relay, ATM, and leased-line carrier services, but the embodiment is not so limited. The MTM derives network timing (clock) and distributes it to the UIOs and DVM. The MTM works in addition to the serial ports and does not preclude the use of either serial port or the Ethernet port.

The MAC of an embodiment supports multiple services of a single T1/E1 interface using a flexible time slot mapping scheme, but the embodiment is not so limited. The trunk may be divided by DS0 groups in a manner that best suits a particular user application. The MAC of one embodiment supports two trunk options, the channelized trunk option and the ATM trunk option, but the embodiment is not so limited.

Figure 4:
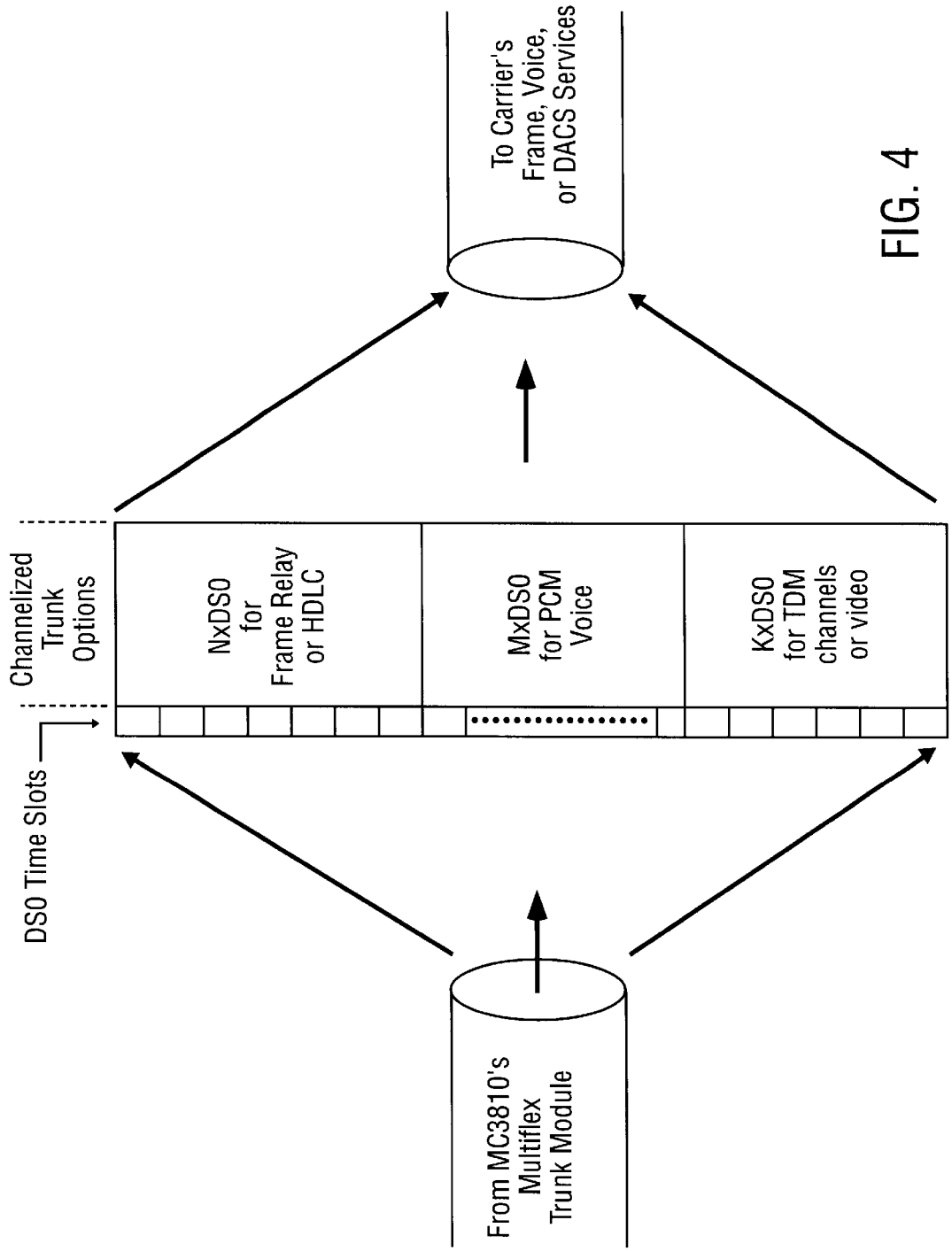
FIG. 4 shows a channelized trunk option of an embodiment of the present invention.

FIG. 4 shows a channelized trunk option of an embodiment of the present invention. The channelized trunk option utilizes the multiservice features of the MTM. The first N time slots are reserved for Frame Relay or HDLC trunk services, but the embodiment is not so limited. Packetized, compressed voice and data is carried within this band of N time slots. The next M time slots may be reserved for PCM voice, but the embodiment is not so limited. The carrier network routes PCM encoded voice on these time slots to their standard PSTN voice network. Lastly, K time slots are reserved for data and/or video transport through a carrier Digital Access and Cross-connect System (DACS) network, but the embodiment is not so limited. These K time slots, traditionally serviced by TDM networks, may be used to provide direct connections for real time data applications, for example, video. Any of the three trunk groups may use all or none of the DS0 time slots. It is noted that the sum of (M+N+K) is less than or equal to 24 for a t1 configuration, and less than or equal to 30 for an E1 configuration, but the embodiment is not so limited.

Figure 5:
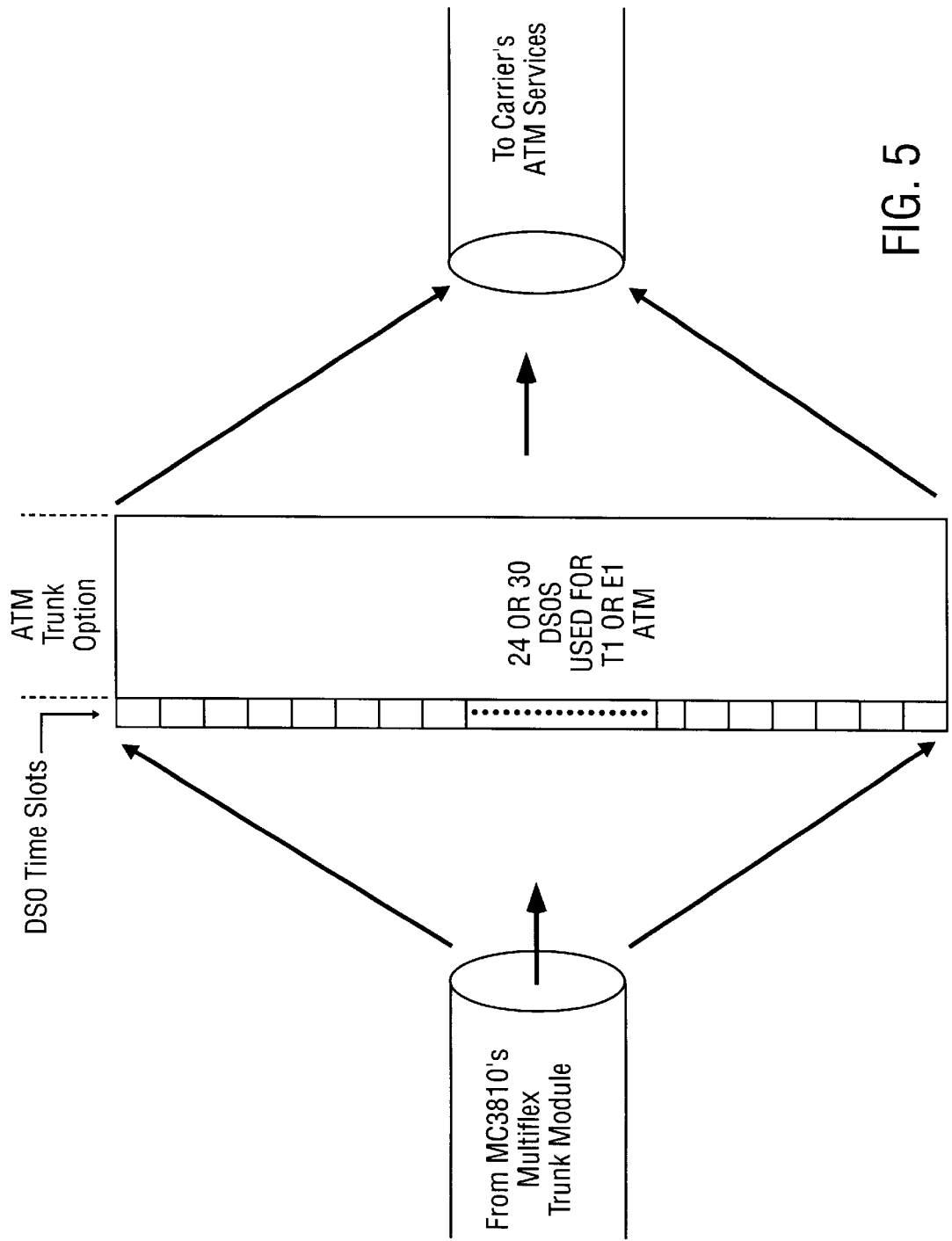
FIG. 5 shows an ATM trunk option of an embodiment of the present invention.

FIG. 5 shows an ATM trunk option of an embodiment of the present invention. The ATM trunk option utilizes the ATM functions of the MAC of one embodiment. In this mode the full T1/E1 is devoted to ATM. Voice connections are made via compressed voice using variable bit rate services. As with the channelized trunk option, multiple services, including LAN and video, may be passed over the ATM trunk.

The DVM of an embodiment provides connectivity to a digital private branch exchange or channel bank. The DVM is functionally equivalent to the MTM, but the embodiment is not so limited. Furthermore, the DVM provides a digital cross-connect function, allowing ingress time slots to be mapped directly to time slots on the out-bound MTM, but the embodiment is not so limited.

Figure 6:
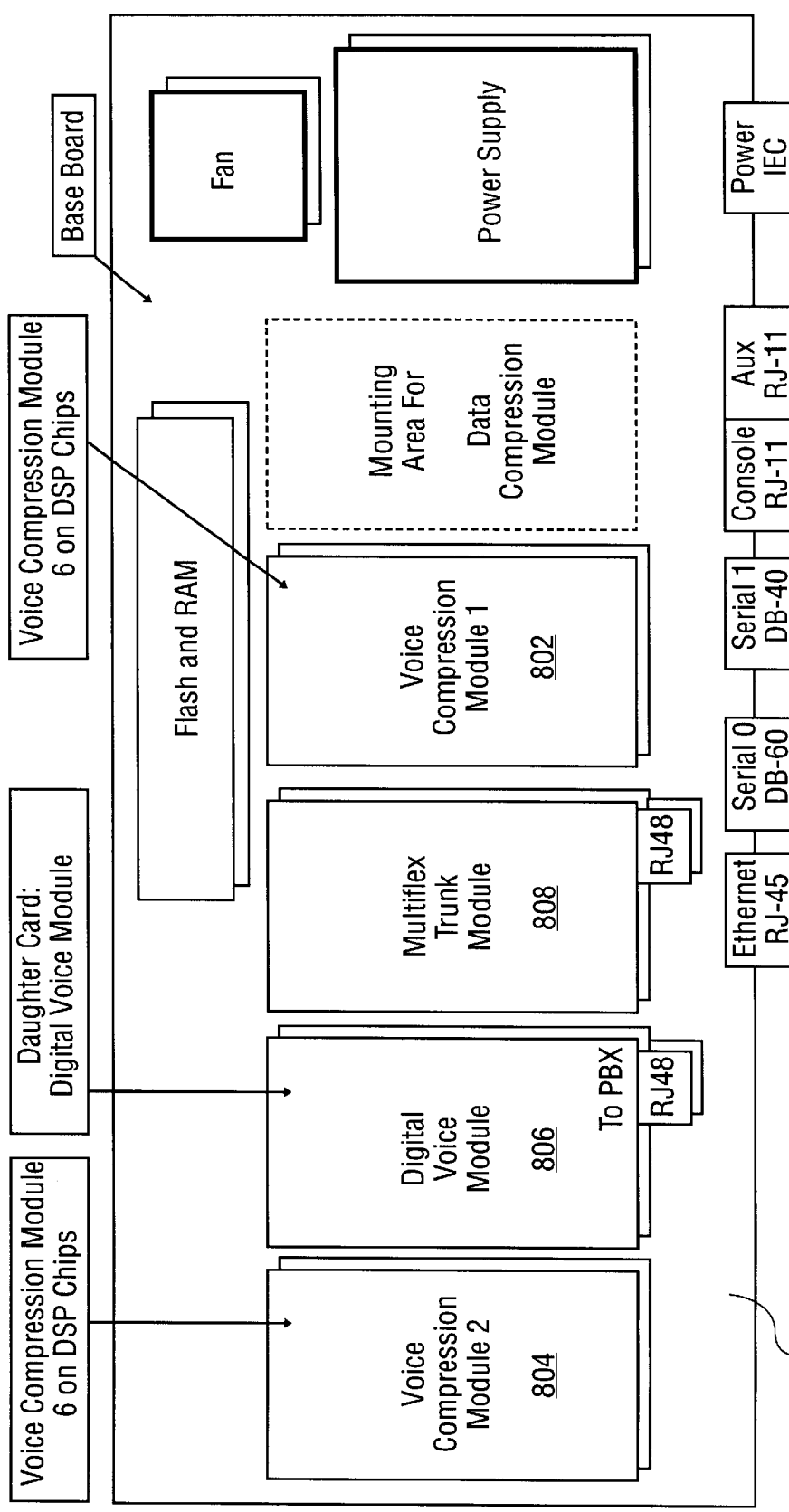
FIG. 6 is a block diagram of a MAC configuration of an embodiment of the present invention comprising digital voice and T1/E1 trunk capabilities.

FIG. 6 is a block diagram of a MAC configuration 800 of an embodiment of the present invention comprising digital voice and T1/E1 trunk capabilities.

The MAC digital voice configuration comprises VCM 1 802, VCM 2 804, a DVM 806, and a MTM 808, but the embodiment is not so limited. Each of VCM 1 802 and VCM 2 804 comprises six digital signal processing (DSP) chips, but the embodiment is not so limited. The full digital voice configuration provides 24 compressed voice channels, but the embodiment is not so limited. In one embodiment, a private branch exchange is connected to the DVM 806, wherein voice channels are either mapped into voice compression channels, or mapped directly to PCM time slots allocated on the MTM 808. By using an external channelized device, such as a multiplexer, channel bank, or video codec, data can be mapped into the DVM 806 from outside sources and then directly to the MTM 808. North American Channel Associate Signaling (CAS) and Mercury CAS for the United Kingdom are supported; furthermore, Common Channel Signaling (CCS) is supported, but the embodiment is not so limited.

Figure 7:
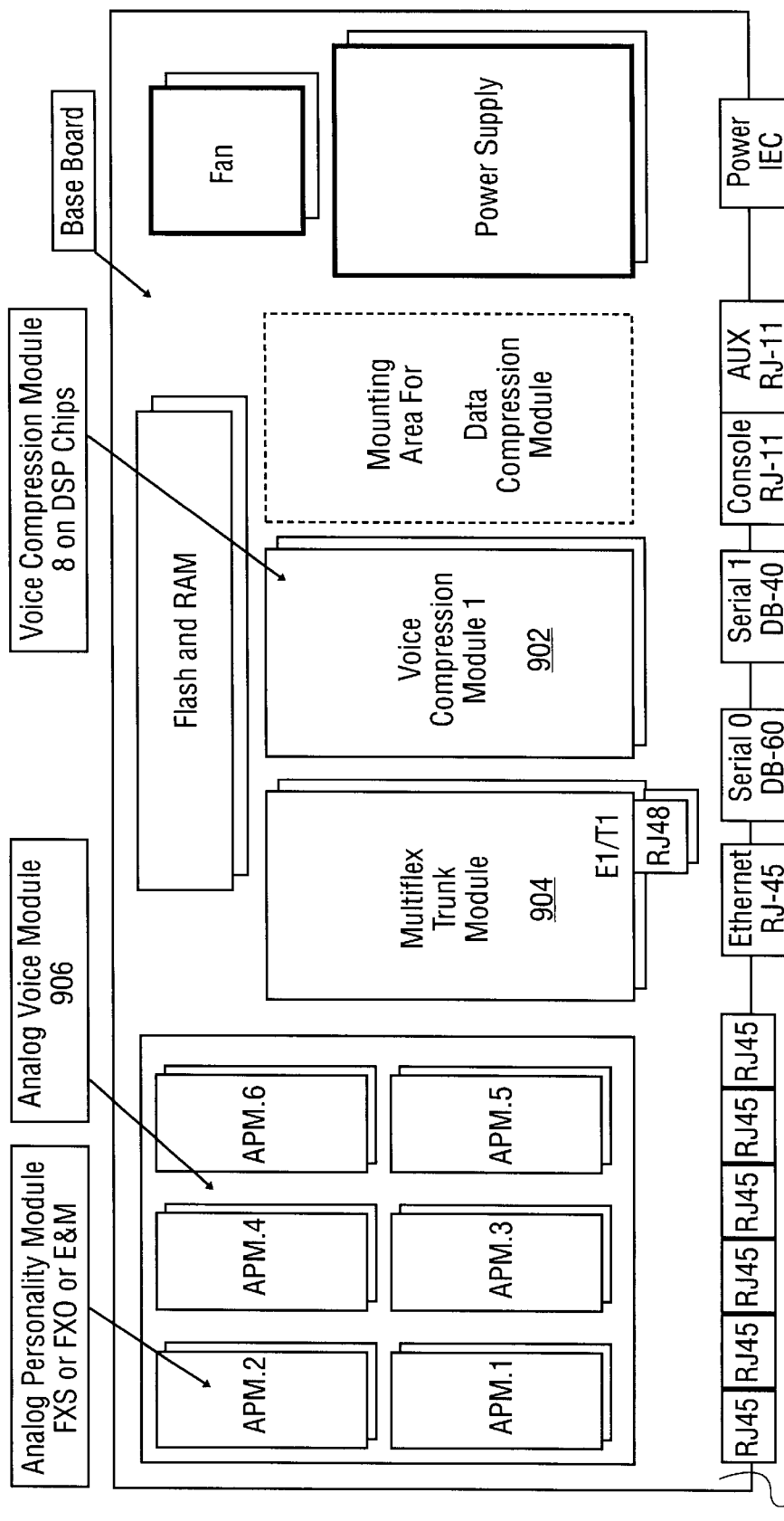
FIG. 7 is a block diagram of a MAC configuration of an embodiment of the present invention comprising analog voice and T1/E1 trunk capabilities.

The AVM of an embodiment provides six analog voice interfaces, but the embodiment is not so limited. The interfaces may be used with analog telephones, key systems, and private branch exchanges. FIG. 7 is a block diagram of a MAC configuration 900 of an embodiment of the present invention comprising analog voice and T1/E1 trunk capabilities. The MAC analog voice configuration comprises VCM 1 902, a MTM 904, and an AVM 906, but the embodiment is not so limited. The AVM 906 provides headers for mounting up to six Analog Personality Modules (APMs), but the embodiment is not so limited. An interface is activated when the user installs the desired style of APM on the AVM 906, wherein the desired style comprises FXS, FXO, and E&M, but the embodiment is not so limited. The AVM/APM combination provides, but is not limited to, the following features: six ports of FXS, FXO or E&M, in any combination; integrated talk battery and ring generator; adjustable transmit and receive levels; 2-wire FXS/FXO voice interface; 2 and 4 wire E&M interface; Wink Start, Immediate Start, & Delayed Start; software configurable ground start, loop start, or battery reversing signaling; software configurable a-law or mu-law PCM encoding; and, software configurable impedance. The VCM 1 902 comprises six DSP chips, but the embodiment is not so limited.

The APMs comprise FXO, FXS, and E&M signaling modules that are mounted on the AVM 906. The APMs comprise the codec that digitizes the voice into PCM samples, wherein the PCM samples are passed to the voice compression services. Furthermore, in one embodiment, FXS ports supply battery and connect to a telephone, FXO ports receive battery and connect to a central office trunk, and E&M ports connect to analog line cards on private branch exchanges, but the embodiment is not so limited.

In supporting voice channels, one embodiment of the MAC connects to the following types of telephone systems, but the embodiment is not so limited: analog telephone set via 2 wire connections; analog private branch exchange via 2 or 4 wire interface; key system via 2 or 4 wire connection; digital private branch exchange via T1/E1. Furthermore, signaling translation among FXS, FXO, and E&M types is supported on both the analog and digital interfaces.

The MAC of an embodiment uses several techniques to ensure near toll-quality voice when using public Frame Relay networks. These techniques comprise, but are not limited to, CS-ACELP voice compression, priority queuing, packet segmentation, and dynamic jitter control. Many of these techniques are inherent in ATM in some form. Therefore, when using an ATM trunk, the ATM Quality of Service (QOS) parameters, traffic shaping, and guaranteed cell size provide service guarantees.

Priority queuing ensures that frames in outbound voice queues are serviced before data traffic. The MAC of an embodiment supports two service classes, real time and non-real time, but the embodiment is not so limited. The real time class is used for voice and video, and the non-real time class is used for data, but the embodiment is not so limited. Real time virtual channel queues are serviced in a round-robin fashion, and they are completely emptied before any non-real time channel queues are serviced. Non-real time virtual channel queues are serviced when there are no real time cells in the queues. Data channel queues are also serviced in a round-robin fashion. It is noted that data channels of an embodiment are not completely locked out if voice and video are present.

The voice capabilities of an embodiment of the MAC are closely tied to the trunk options, but the embodiment is not so limited. The MAC of an embodiment supports a serial trunk option, a multiflex trunk option, and an ATM trunk option, but the embodiment is not so limited.

Figure 8:
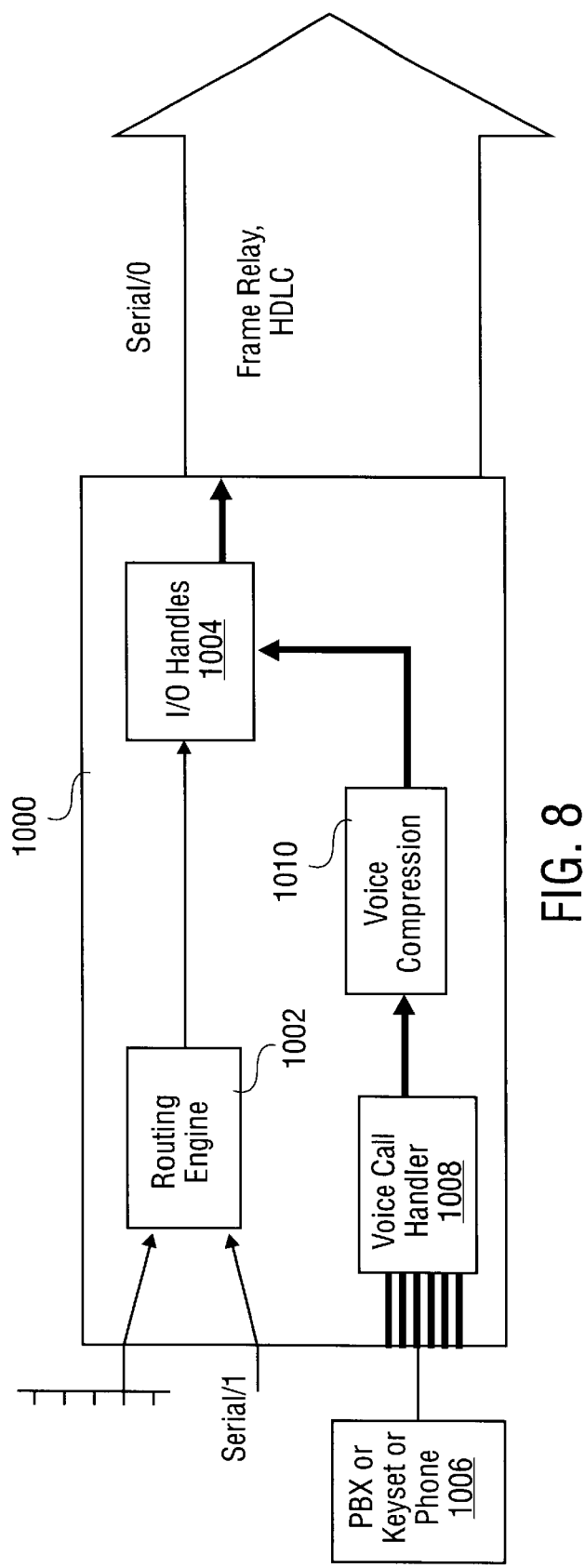
FIG. 8 shows the data and voice flows when using a serial port as a network interface in an embodiment of the MAC of the present invention.

FIG. 8 shows the data and voice flows when using a serial port as a network interface in an embodiment of the MAC 1000 of the present invention. Data is received into a routing engine 1002 and passed to an I/O handler 1004. Voice channels are received from a private branch exchange, keyset, or telephone 1006. The received voice channels are routed to a voice call handler 1008, a voice compression engine 1010, and to an I/O handler 1004. The I/O handler 1004 couples the data and voice to serial port 0 as the network interface.

Figure 9:
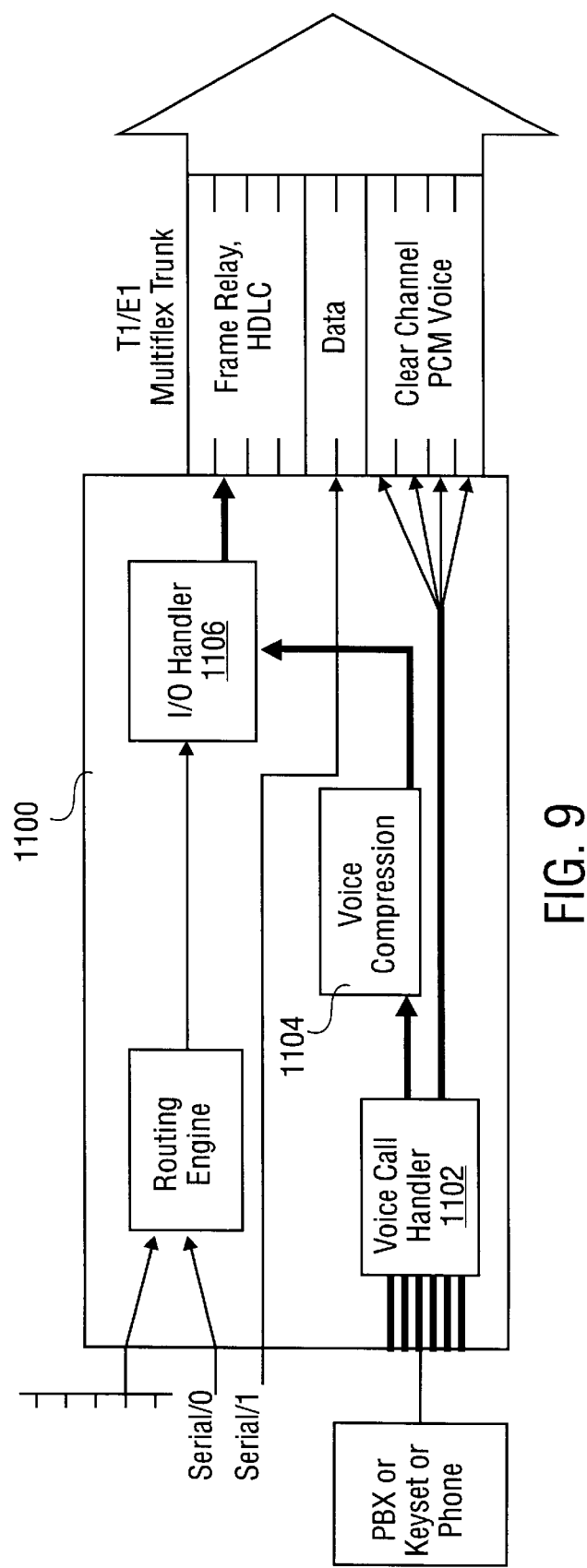
FIG. 9 shows the voice handling capability when using the multiflex trunk in an embodiment of the MAC of the present invention.
Figure 10:
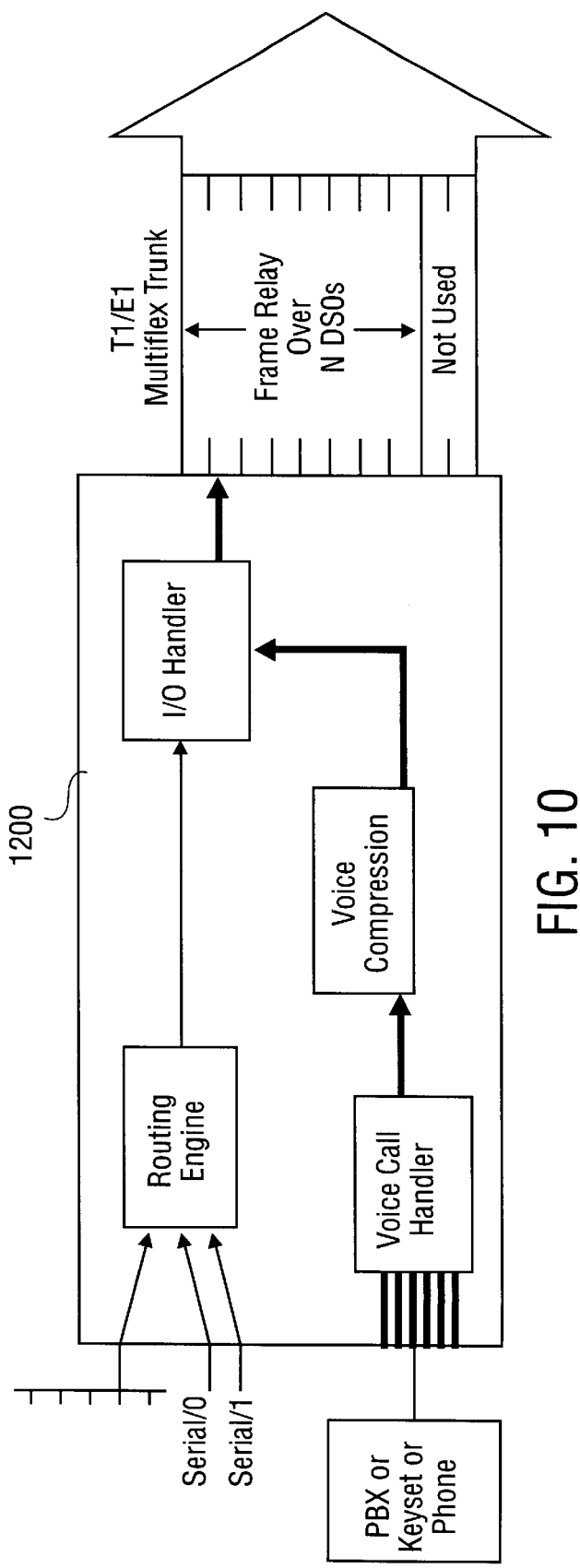
FIG. 10 shows the voice handling capability when using the T1/E1 multiflex trunk partially or entirely for Frame Relay in an embodiment of the MAC of the present invention.

FIG. 9 shows the voice handling capability when using the multiflex trunk in an embodiment of the MAC 1100 of the present invention. Using this configuration, voice calls are routed through the voice call handler 1102. When the channel is configured for TDM cross connect, the call is routed directly to the T1/E1 trunk, bypassing the voice compression engine 1104. The carrier can then, within its DACS network, peel off the PCM channels and route them to the PSTN. The TDM cross connect function is available when the DVM is used for access to a private branch exchange, but the embodiment is not so limited. When the voice calls are configured to be compressed, the bit stream is passed to the voice compression engine, or sub-system, and then to the I/O handler 1106. The I/O handler 1106 encapsulates the voice in Frame Relay or HDLC and then passes the encapsulated voice to the trunk, but the embodiment is not so limited. FIG. 10 shows the voice handling capability when using the T1/E1 multiflex trunk partially or entirely for Frame Relay in an embodiment of the MAC 1200 of the present invention.

Figure 11:
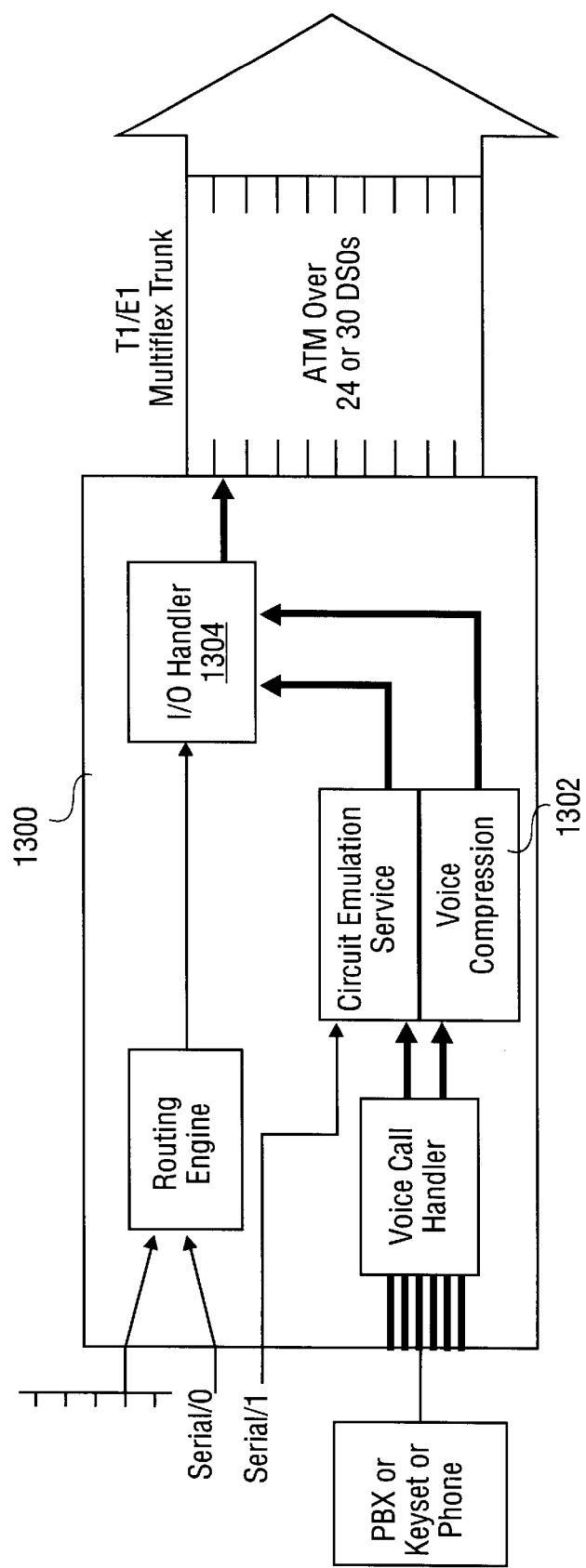
FIG. 11. shows the voice handling capability when using the ATM trunk in an embodiment of the MAC of the present invention.

FIG. 11 shows the voice handling capability when using the ATM trunk in an embodiment of the MAC 1300 of the present invention. Using this configuration, voice calls first go through the voice compression engine 1302 and are subsequently passed to the I/O handler 1304. The cells are then placed in a variable bit rate stream, but the embodiment is not so limited. A VCM performs voice compression, echo cancellation, silence suppression, and DTMF detection. The DTMF tones are passed through and are not locally emulated across a network connection, but the embodiment is not so limited.

In providing packetized voice, the MAC of an embodiment provides for the transport of compressed voice using data link formats comprising Frame Relay, ATM, and HDLC. The multiplexing of different types of traffic comprising voice, data, and facsimile, is provided over a single Frame Relay permanent virtual circuit (PVC). This feature reduces the cost of the Frame Relay network by reducing the number of PVCs required over each link. If desired, users may configure voice and data on different PVCs.

In one embodiment, the present invention includes a mechanism for increasing the reliability of Frame Relay networks handling voice data configured in accordance with Frame Relay Forum implementation agreement FRF.11. FRF.11 defines a mechanism for multiplexing up to 255 voice channels onto a single Frame Relay virtual circuit. FRF.11 does not, however define a mechanism for determining link state at the voice channel level. In one embodiment, the present invention uses an Alarm Indicator Signal (IAS) bit of the FRF.11 Annex B CAS frame to indicate link state. The signaling frame is sent by one or both ends of a channel through all intervening switches in a loop back to the sending end. Because the frame is an FRF frame, it is passed transparently by all FRF compatible switches. This mechanism is therefore implemented in an existing FRF.11 network with minimum additional overhead.

Annex B signaling frames are 15 bytes and are sent at least every five seconds. When sent every five seconds, Annex B signaling frames use 30 bps per channel. An Annex B frame includes a VoFR header and a payload. The first byte following the VoFR header contains a seven-bit sequence number with the most significant bit assigned as an AIS bit. The significance of the AIS bit is determinable by the system designer. Following the sequence number are a series of octets. The transfer syntax for signaling bits contains 60 milliseconds worth of samples for up to four signaling bits. Sixteen state or four state encoding may be used. For example, for sixteen state encoding, bits designated A, B, C, and D are used to signal states such as on-hook, off-hook, ringer on, etc. Embodiments of this mechanism may be extended for use with any packet transport method that is adapted from FRF.11. For instance, some voice over ATM methods send voice frames using FRF.11 structures.

In one embodiment, the present invention includes software that controls link state determination. The software is stored in program memory as shown and described with reference to FIG. 1. The link state determination method of one embodiment will now be described. For each FRF.11 channel connection, one end of the connection is defined as an initiator and one end is defined as a reciprocator. The initiator and reciprocator are typically MACs. A variable number of intervening MACs or other switching devices may be along a path between the initiator and the reciprocator. The initiator sends Annex B CAS signaling frames along each path that has been predefined as a possible voice route to the reciprocator. When the reciprocator receives the Annex B frames, it deduces that the paths along which it received the frames are functional. The reciprocator then responds by sending its own Annex B signaling frames along each of the paths from which it received an Annex B frame. The reciprocator does not send Annex B signaling frames along a path unless it receives Annex B signaling from the initiator. When the initiator receives a reciprocal Annex B frame from a path, it deduces that that path is a functional two-way path. An advantage of the method is that the initiator and the reciprocator can determine the link state of several candidate routes at once. This allows for instantaneous rerouting decisions when path failure occurs on the primary route.

In one embodiment, the initiator sends Annex B signaling frames simultaneously along several paths. The initiator sets the AIS bit to "0" on the path that it considers to be active, and sets the AIS bit to "1" on all other paths. The reciprocator receives the. Annex B signaling frames along several paths at the same time, and by inspecting the AIS bit, determines which is considered the primary path. The reciprocator then returns the signaling frames with the AIS bit set to 0 on the primary path and the AIS bit set to 1 on all other paths.

When a path fails in either direction, the initiator will stop receiving the Annex B signaling frames from the reciprocator on the failed path. The initiator then chooses another path from the alternate paths and sends AIS 0 on the chosen path. The chosen alternate path then becomes the primary path. The initiator also begins to send AIS 1 on the failed primary path. When AIS 1 is returned on the failed primary path, the initiator may switch back to the restored former primary path. In summary, the initiator can deduce link state as follows:

| AIS Bit Received | Link State |
| --- | --- |
| 0 | path up and active |
| 1 | path up and in standby state |
| no AIS bit | path is failed |

Figure 12:
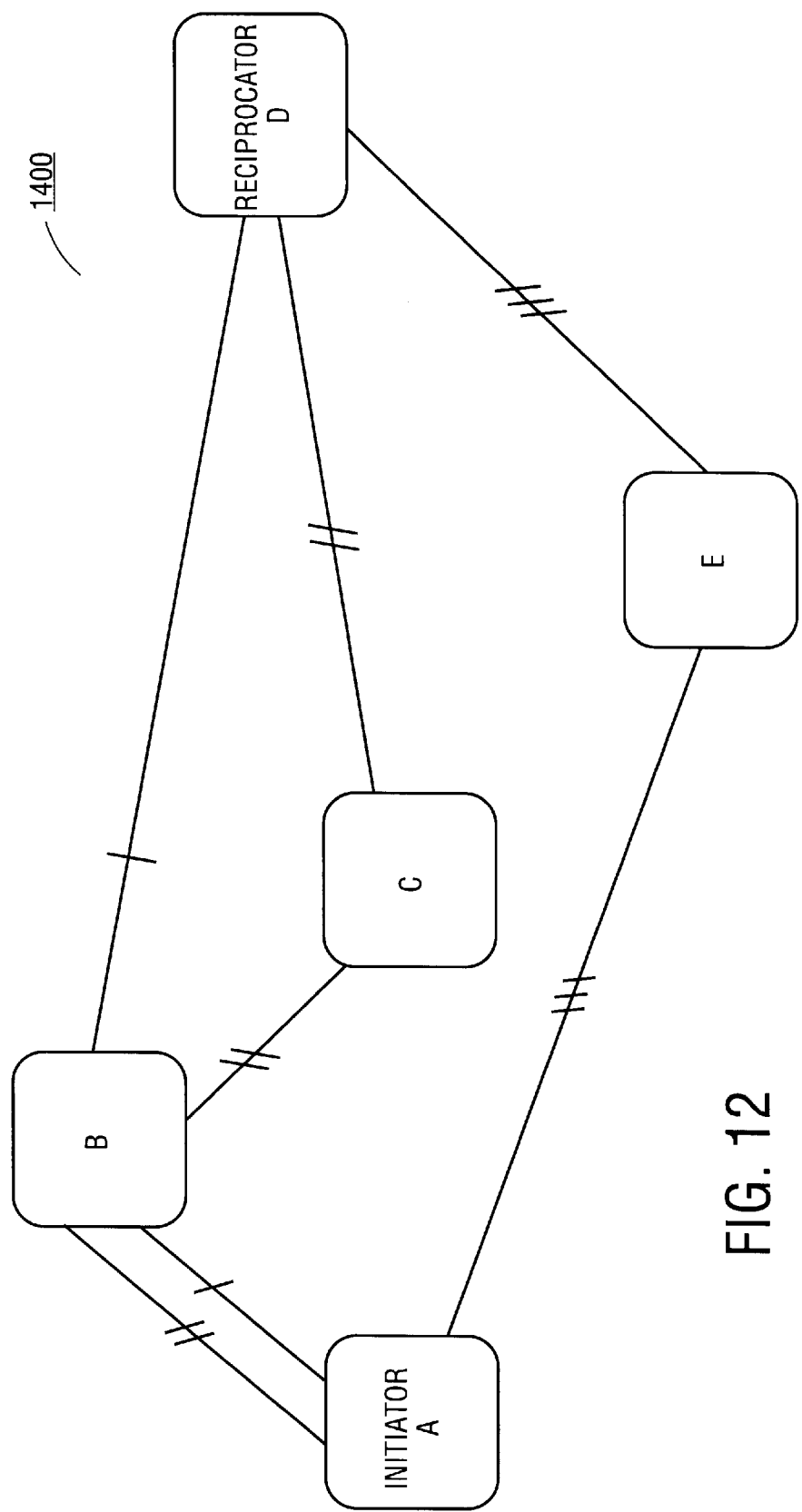
FIG. 12 is a block diagram of one embodiment of an FRF.11 network.

FIG. 12 illustrates an FRF.11 network 1400 of one embodiment. Initiator A is connected to reciprocator D by three paths, ABD, ABCD, and AED. Initiator A and reciprocator D recognize and interpret Annex B frames while intervening switches B, C, and E merely forward the Annex B frames along the path. An example of an embodiment of a link state determination method follows with reference to FIG. 12. Initiator A begins by sending an Annex B frame with AIS 0 through B and an Annex B frame with AIS 1 through E. B forwards the Annex B frame directly to reciprocator D. Reciprocator D responds by sending an Annex B frame with AIS 0 back to B and an Annex B frame with AIS 1 back to E.

When the path between B and D fails, D no longer receives AIS through B and stops reciprocating through B. A then notices that it has stopped receiving AIS through B and switches to the AED path. A then sends AIS 0 through E (along with voice information frames) and AIS 1 through B (without voice information frames). D receives AIS 0 through E and reciprocates with AIS 0 (along with voice information frames). In the meanwhile, B notices, through standard LMI mechanisms, that its onward path to D has failed and that it may reroute through C. Once the reroute is complete, the AIS 1 frame that A is sending through B will be forwarded through C and arrive at D. D again reciprocates and returns AIS 1 through C. A now receives a reciprocated AIS bit through both B and E, and may choose to return to using B as the primary route.

This method provides the advantage of allowing quick determination of resolved failures so that a restored path may be used as soon as it becomes available. Another advantage is that because intervening switches such as B, C, and E do not need to participate in the channel level link state determination, the method is more likely to be effective in multi-vendor networks.

Figure 13:
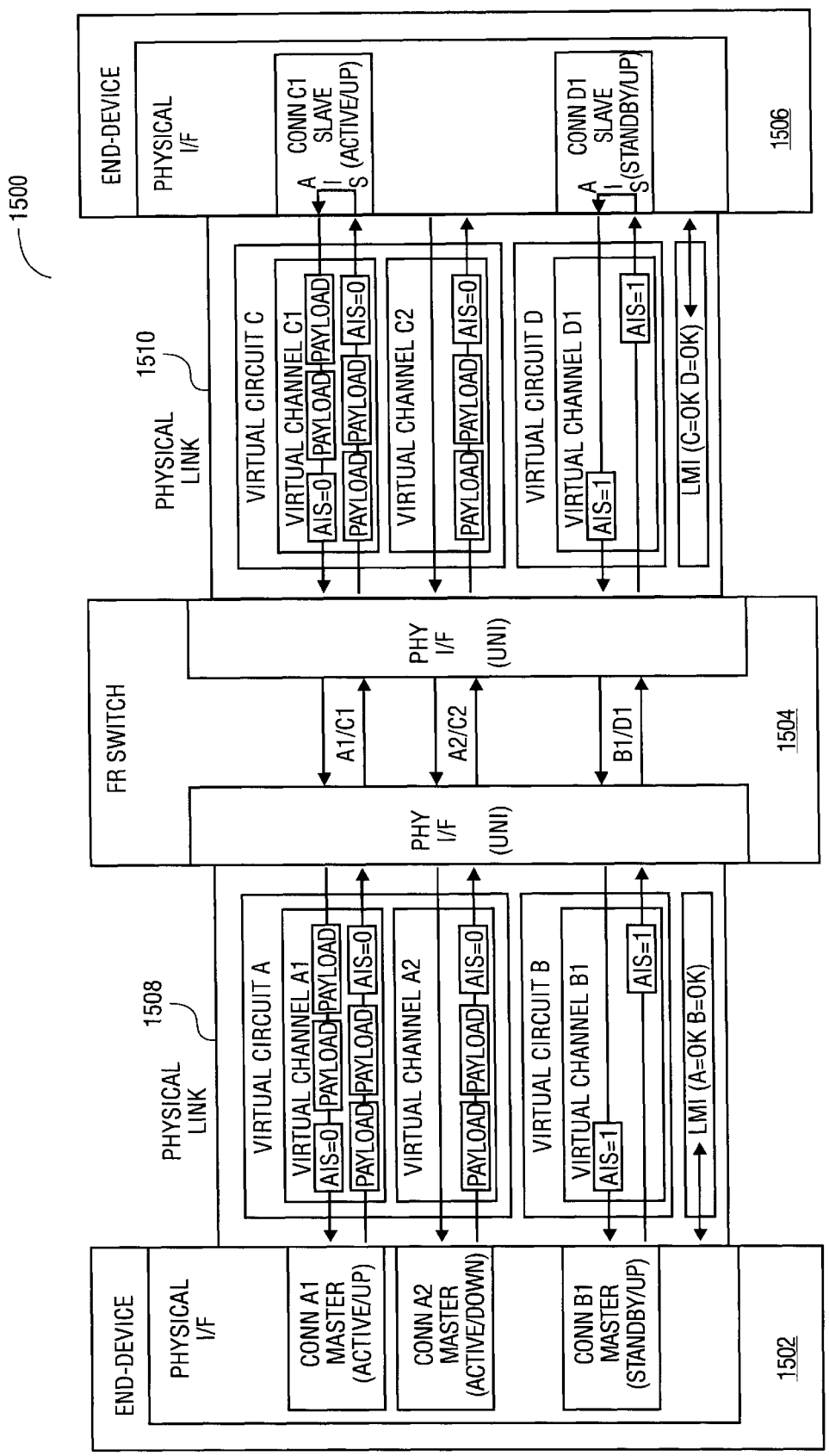
FIG. 13 is a block diagram of one embodiment of a voice over frame-relay network.

FIG. 13 is a block diagram of a voice over frame-relay network 1500 of one embodiment that supports FRF.11. Network 1500 includes three switching devices, end device 1502, end device 1506 and intervening FR switch 1504. Devices 1502, 1504, and 1506 may each be a MAC as described herein. In some embodiments, devices 1502 and 1506 are MACs as described herein, while FR switch 1504 is any existing device capable of switching FRF formatted voice data.

In network 1500, device 1502 is an initiator, that is, connections A1, A2 and B1 of device 1502's physical interface are the master sides of their respective connections. Device 1506 is a slave device. The physical interface of device 1506 includes connections C1 and D1. FR switch 1504 includes a physical interface on the master side and a physical interface on the slave side. On the master side, FR switch 1504 is connected to device 1502 through physical link 1508. On the slave side, FR switch 1504 is connected to device 1506 through physical link 1510.

Virtual circuits A and B are multiplexed onto physical link 1508. Virtual channels A1 and A2 are multiplexed onto virtual circuit A and virtual channel B1 is multiplexed onto virtual circuit B. Virtual circuits C and D are multiplexed onto physical link 1510. Virtual channels C1 and C2 are multiplexed onto virtual circuit C and virtual channel D1 is multiplexed onto virtual circuit D.

In the example shown in FIG. 13, A1/C1 and A2/C2 are primary channels and B1/D1 is a backup channel. The AIS bit is initiated by master device 1502. In one embodiment, an AIS bit that is 0 indicates that the channel is active (or primary) and an AIS bit that is 1 indicates that the channel is in a standby state. Slave device 1506 returns AIS bits received. If master device 1502 receives the same AIS bit that it sent, the channel connection is up. If master device 1502 does not receive the same AIS bit that it sent, the channel connection is down.

In the example, A1 is active, so AIS 0 is sent and C1 returns AIS 0. A1/C1 is then declared active/up. A2 is also active, so AIS 0 is sent. For some reason, however, the C2 endpoint for channel A2/C2 is down or not defined. Therefore, AIS 0 is not returned and A2/C2 is declared active/down. B1 is standby, so it sends AIS 1. D1 returns AIS 1 and B1/D1 is declared standby/up. While a channel is standby, only signaling frames and no payload frames are sent.

Figure 14:
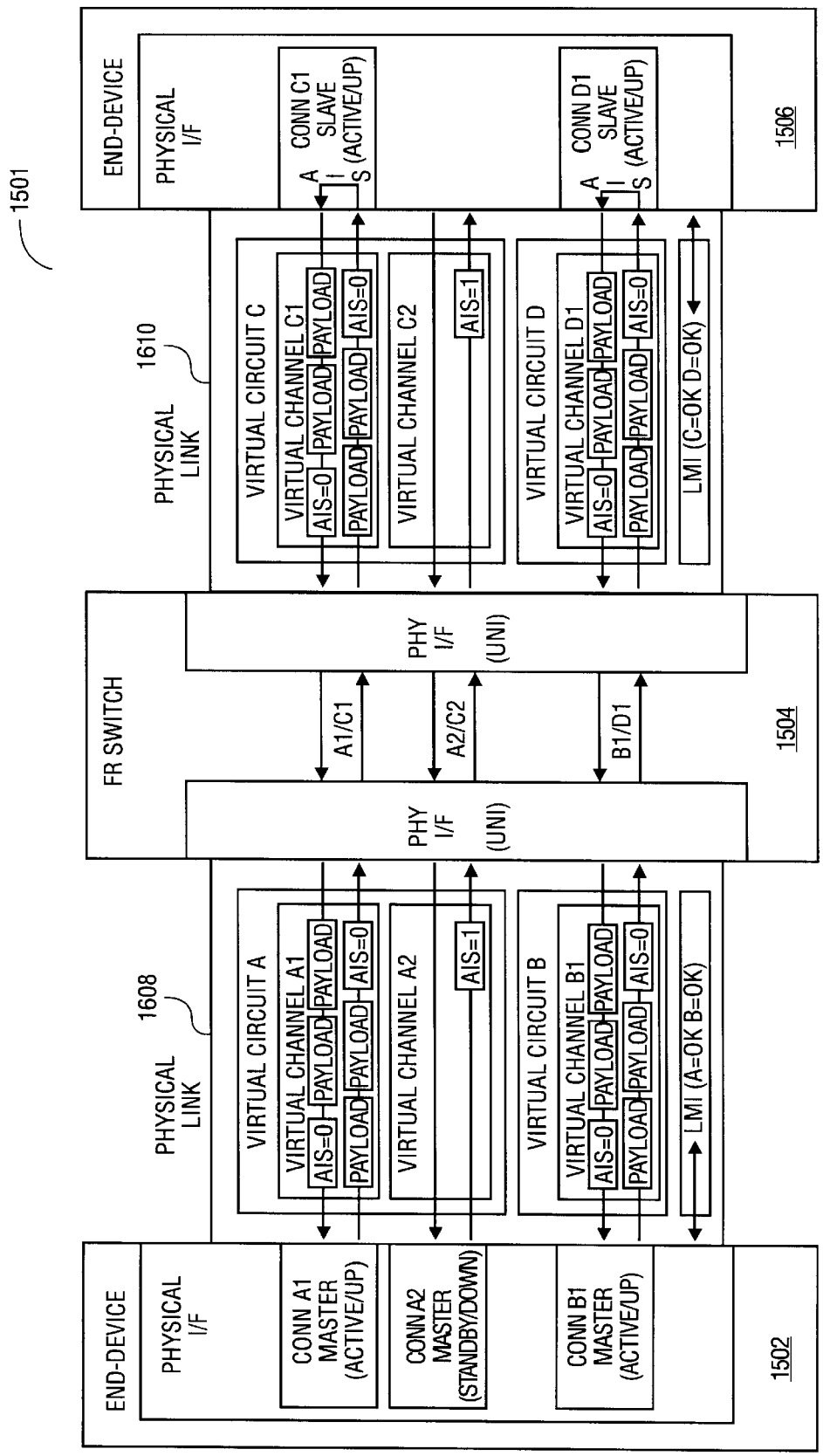
FIG. 14 is a block diagram of one embodiment of a voice over frame-relay network.

Referring now to FIG. 14, the example is continued. FIG. 14 is a block diagram of a voice over frame-relay network 1501. Network 1501 is network 1500 at a later point in time. At this time, A2 has detected that the connection is broken by detecting that it did not receive the AIS bit that was sent. Device 1502 switches to backup channel B1/D1 and sends AIS 0 and payload frames on channel B1. Device 1506 senses that channel D1 is being activated by master device 1502 by detecting AIS 0. Channel D1 then returns AIS 0 and begins sending payload frames on channel D1.

The invention has been described in conjunction with the preferred embodiment. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. In a voice over packet-data-network system, a method for determining a link state for a permanent call, comprising:
   an initiator Multiservice Access Concentrator (MAC) determining a primary path to a reciprocator MAC;
   the initiator MAC determining a plurality of alternate paths to the reciprocator MAC;
   the initiator MAC sending a first status signal over the primary path;
   the initiator MAC sending a second status signal over each of the alternate paths;
   if the first status signal is returned by the reciprocator MAC, the initiator MAC sending payload data over the primary path; else
   the initiator MAC determining that the primary path has failed; wherein failure of the primary path comprises failure of a virtual channel in the primary path.

2. The method of claim 1, further comprising:
   the initiator MAC receiving at least one of the second status signals from the reciprocator MAC over at least one of the alternate paths;
   the initiator MAC determining that the at least one alternate path is viable; and
   when the initiator MAC determines that the primary path has failed, the initiator MAC sending the first status signal and payload data over one of the at least one viable alternate paths.

3. The method of claim 2, wherein the first status signal and the second status signal are each included in a standard signaling frame.

4. The method of claim 3, wherein the standard signaling frame is a Frame Relay Forum signaling frame, and wherein the first status signal and the second status signal are different states of an alarm bit that communicates status of a link at a virtual channel level.

5. The method of claim 1, wherein failure of the primary path further comprises failure of a link at a virtual circuit level as communicated by a Local Management Interface (LMI).

6. In a voice over packet-data-network system, a method for determining a link state for a permanent call, comprising:
- an initiator Multiservice Access Concentrator (MAC) determining a primary path to a reciprocator MAC;
- the initiator MAC determining a plurality of alternate paths to the reciprocator MAC;
- the initiator MAC sending a standard signaling frame over the primary path, wherein the standard signaling frame includes a status bit set to a first value;
- the initiator MAC sending the standard signaling frame over each of the plurality of alternate paths, wherein the standard signaling frame includes a status bit set to a second value;
- if the initiator MAC receives the standard signaling frame with a status bit set to the first value from the reciprocator MAC, the initiator sending payload data over the primary path; else
- the initiator MAC choosing an alternate path over which to send the payload data.

7. The method of claim 6, wherein the initiator MAC choosing an alternate path includes:
- the initiator MAC receiving at least one standard signaling frame with a status bit set to the second value from the reciprocator MAC over at least one of the plurality of alternate paths;
- the initiator MAC choosing one of the alternate paths over which the at least one standard signaling frame was received;
- the initiator MAC sending the standard signaling frame with a status bit set to the first value over the chosen alternate path; and
- the initiator MAC sending payload data over the chosen alternate path.

8. The method of claim 7, further comprising:
- the initiator MAC sending a standard signaling frame with a status bit set to the second value over the failed primary path; and
- if the initiator MAC receives the standard signaling frame with the status bit set to the second value over the failed primary path, the initiator MAC determining that the failed primary path is a viable alternate path.

9. The method of claim 8, wherein the standard signaling frame is a Frame Relay Forum.11 (FRF.11) signaling frame, and wherein the status bit is an alarm Indicator Signal (AIS) bit.

10. The method of claim 9, wherein receipt of the FRF.11 signaling frame over a path indicates that a link state of voice channels in the path is an operable state.

11. In a packet-data-network system, an apparatus for routing integrated traffic comprising data, voice, and video traffic, the apparatus, comprising at least one processor, wherein the at least one processor is configured to control the apparatus to:
- packetize voice data for transmission through the packet-data-network, wherein transmission through the packet-data-network includes using one of a plurality of paths to a device at a termination point, wherein each of the plurality of paths comprises a plurality of permanent virtual circuits, and wherein each permanent virtual circuit comprises a plurality of virtual channels;
- designate one of the plurality of paths: as a primary path;
- transmit the packetized voice data through the packet-data-network using the primary path; and
- transmit a first signaling frame associated with the packetized voice data through the packet-data-network using the primary path, wherein the first signaling frame indicates that the packetized voice data is transmitted using the primary path, and further indicates a status of a virtual channel in the primary path.

12. The apparatus of claim 11, wherein the at least one processor is further configured to control the apparatus to transmit a second signaling frame through the packet-data-network using each of the plurality of paths other than the primary path, wherein each of the plurality of path other than the primary path is an alternate path, and wherein the second signaling frame indicates that the second signaling frame is transmitted using an alternate path, and further indicates a status of a virtual channel in the alternate path.

13. The apparatus of claim 12, wherein the at least one processor is further configured to control the apparatus to:
- receive at least one of the second signaling frames using at least one of the alternate paths, wherein the at least one second signaling frame is returned from the device at the termination point;
- designate the at least one alternate path as a viable alternate path; and
- if a first signaling frame is not received from the device at the termination point, determining that the primary path is not viable.

14. The apparatus of claim 13, wherein the at least one processor is further configured to control the apparatus to:
- if it is determined that the primary path is not viable, transmit the packetized voice data to the device at the termination point using one of the at least one viable alternate paths; and
- transmit a first signaling frame associated with the packetized voice data using the viable alternate path.

15. The apparatus of claim 14, wherein the at least one processor is further configured to control the apparatus to transmit the second signaling frame using the primary path.

16. The apparatus of claim 12, wherein each of the first signaling frame and the second signaling frame are Frame Relay Forum.11 (FRF.11) Annex B signaling frames.

17. The apparatus of claim 16, wherein the first signaling frame includes an Alarm Indicator Signal (AIS) bit set to a first value, and wherein the second signaling frame includes an AIS bit set to a second value.

18. In a packet-data-network system, an apparatus for routing integrated traffic comprising data, voice, and video traffic, the apparatus, comprising at least one processor, wherein the at least one processor is configured to control the apparatus to:
- receive a plurality of data packets comprising voice data using one of a plurality of paths between the apparatus and a device at an initiation point, wherein each of the plurality of paths comprises a plurality of permanent virtual circuits, and wherein each permanent virtual circuit comprises a plurality of virtual channels; and
- for each data packet received, receive a first signaling frame that indicates that the packetized voice data is transmitted using a primary path, and further indicates a status of a virtual channel in the primary path.

19. The apparatus of claim 18, wherein the at least one processor is further configured to control the apparatus to receive a second signaling frame using each operable path of the plurality of paths other than the primary path, wherein each of the second signaling frames indicates that an associated path is an operable alternate path.

20. The apparatus of claim 19, wherein the at least one processor is further configured to control the apparatus to, for each path of the plurality of paths that does not include an inoperable virtual channel detectable by the apparatus, return the first signaling frame and the second signaling frame using respective paths on which the signaling frames arrived.

21. A computer readable medium containing executable instructions which, when executed in a processing system, cause the system to perform a method for determining a link state for a permanent call in a voice over data network, the method comprising:
- a master device determining a primary path to a slave device, wherein a path is a route through the network for packetized voice data;
- the master device determining a plurality of alternate paths to the slave device;
- the master device sending a first status signal over the primary path;
- the master device sending a second status signal over each of the alternate paths;
- if the first status signal is returned by the slave device, the master device sending payload data over the primary path; else
- the master device determining that the primary path has failed; wherein failure of the primary path comprises failure of a virtual channel in the primary path.

22. The computer readable medium of claim 21, wherein the method further comprises:
- the master device receiving at least one of the second status signals from the slave device over at least one of the alternate paths;
- the master device determining that the at least one alternate path is viable; and
- when the master device determines that the primary path has failed, the master device sending the first status signal and payload data over one of the at least one viable alternate paths.

23. The computer readable medium of claim 22, wherein the first status signal and the second status signal are each included in a standard signaling frame.

24. The computer readable medium of claim 23, wherein the standard signaling frame is a Frame Relay Forum signaling frame, and wherein the first status signal and the second status signal are different states of an alarm bit that communicates status of a link at a virtual channel level.

25. The computer readable medium of claim 21, wherein failure of the primary path further comprises failure of a link at a virtual circuit level as communicated by a Local Management Interface (LMI).

* * * * *